United States Patent
Ashitani

(10) Patent No.: US 11,019,264 B2
(45) Date of Patent: May 25, 2021

(54) IMAGING DEVICE, CONTROL METHOD, AND RECORDING MEDIUM

(71) Applicant: CANON KABUSHIKI KAISHA, Tokyo (JP)

(72) Inventor: Satoshi Ashitani, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/737,379

(22) Filed: Jan. 8, 2020

(65) Prior Publication Data

US 2020/0252531 A1    Aug. 6, 2020

(30) Foreign Application Priority Data

Jan. 31, 2019 (JP) ............................. JP2019-016155

(51) Int. Cl.
  *H04N 5/232* (2006.01)
  *G02B 27/64* (2006.01)
  *H04N 7/18* (2006.01)

(52) U.S. Cl.
  CPC ......... *H04N 5/2328* (2013.01); *G02B 27/646* (2013.01); *H04N 5/23299* (2018.08); *H04N 7/183* (2013.01)

(58) Field of Classification Search
  CPC ... H04N 5/2328; H04N 5/23299; H04N 7/183
  See application file for complete search history.

(56) References Cited

U.S. PATENT DOCUMENTS 6,509,926 B1    1/2003  Mills et al.
8,184,965 B2    5/2012  Hayashi
(Continued)

FOREIGN PATENT DOCUMENTS

EP      1262072 A2    12/2002
JP    2004-312138 A   11/2004
WO     0162006 A2     8/2001

OTHER PUBLICATIONS

European Search Report dated Jul. 1, 2020 which is enclosed, that issued in the corresponding European Patent Application No. 19217347.4.

(Continued)

*Primary Examiner* — Joseph W Becker
(74) *Attorney, Agent, or Firm* — Cowan, Liebowitz & Latman, P.C.

(57) ABSTRACT

An imaging device includes an imaging unit that images a subject, a shake detection unit that detects shake of the imaging unit, a pan driving unit and a tilt driving unit that rotate the imaging unit in a panning direction and a tilting direction, a pan and tilt control unit that controls the pan driving unit and the tilt driving unit such that an imaging direction of the imaging unit is changed and controls the pan driving unit and the tilt driving unit such that the shake is corrected in accordance with a detection result of the shake detection unit, and an image processing unit that performs image processing on a predetermined region of an image captured by the imaging unit. The image processing unit determines the predetermined region based on a rotational angle of the imaging unit used to change the imaging direction and a rotational angle of the imaging unit used to correct the shake.

9 Claims, 12 Drawing Sheets

(56) References Cited

U.S. PATENT DOCUMENTS

| | | |
|---|---|---|
| 9,794,465 B2 | 10/2017 | Ashitani |
| 10,277,809 B2 | 4/2019 | Wakamatsu |
| 10,482,342 B2 | 11/2019 | Wakamatsu |
| 2011/0164863 A1 | 7/2011 | Hayashi |
| 2016/0134801 A1 | 5/2016 | Ashitani |
| 2017/0134649 A1 | 5/2017 | Wakamatsu |
| 2017/0163879 A1* | 6/2017 | Tsuji ................. H04N 7/183 |
| 2018/0082144 A1 | 3/2018 | Wakamatsu |
| 2018/0288299 A1* | 10/2018 | Wada ............ H04N 5/23258 |

OTHER PUBLICATIONS

Unknown: "Image stabilization—improving camera usability", Jan. 1, 2014(Jan. 1, 2014), XP055706267, Retrieved from the Internet: URL:https://web.archive.org/web/20140723070538if_/http://www.axis.com/files/Whitepaper/wp_image_stabilization_57110_en_1406_Io.pdf.

* cited by examiner

IMAGING DEVICE, CONTROL METHOD, AND RECORDING MEDIUM

BACKGROUND OF THE INVENTION

Field of the Invention

The present invention relates to an imaging device, a control method, and a recording medium.

Description of the Related Art

In surveillance systems, imaging devices with camera platforms which can be controlled through remote operations via networks or dedicated lines are used. As imaging devices with camera platforms, there are devices that include pan and tilting (hereinafter referred to as PT) mechanism units rotating camera head units. Devices that include panning mechanism units performing rotation driving in the horizontal direction and tilting mechanism units performing rotation driving in the vertical direction and can perform electrical zooming can freely change imaging directions and imaging field of view angles.

Of imaging devices used for surveillance systems, there are many imaging devices that have a function, called a privacy mask, of overlapping an image of a single color rectangle on a region which is included in a captured image and for which imaging is desired to be avoided for privacy protection and process an image so that the region is not seen. In an imaging device with camera platforms, when imaging directions are changed by PT, regions which are mask targets in captured images are also moved on screens. Therefore, in the privacy mask function in the imaging devices with the camera platforms, mask-drawn positions in captured images are obtained from PT angles and the target regions are tracked so that the target regions are masked even when the imaging directions are changed by the PT.

Japanese Patent Laid-Open No. 2004-312138 discloses a method of calculating a plurality of vertex positions at which a mask region is formed using a field of view angle and pan and tilt angles to enable a privacy mask to be set at a screen end with a large image distortion near directly below or directly above the region in an imaging direction of a camera.

Some imaging devices used for surveillance systems have an image stabilization function of reducing a shake of a captured image (image shake) occurring due to vibration in an installation environment. As the image stabilization function, there are an electronic image stabilization scheme using correction by image processing, an optical image stabilization scheme of performing correction optically by lens driving or the like, and a scheme called a PT image stabilization scheme of driving a PT mechanism unit for image stabilization. The PT image stabilization scheme enables a shake with large amplitude to be corrected and has characteristics of being particularly effective in an installation environment on a ship or the like in which shaking is great. A term, image stabilization, described in the present specification does not mean suppression of physical vibration such as shake and means correction of image shake of an image caused due to shaking or the like.

In the technology of Japanese Patent Laid-Open No. 2004-312138, however, when a mask-drawn position is obtained based on a PT angle during PT image stabilization control, only a mask image is moved with respect to a captured image in which shake is reduced by image stabilization, and thus a target region may not be masked correctly.

SUMMARY OF THE INVENTION

The present invention provides an imaging device improving tracking of a predetermined region on an image when a PT mechanism performs image-shake correction.

According to the present invention, an imaging device includes: an imaging unit configured to image a subject; a detection unit configured to detect shake of the imaging unit; a pan and tilt driving unit configured to rotate the imaging unit in a panning direction and a tilting direction: an imaging direction changing unit configured to control the pan and tilt driving unit such that an imaging direction of the imaging unit is changed; a correction unit configured to control the pan and tilt driving unit in accordance with a detection result of the detection unit such that shake is corrected; and an image processing unit configured to perform image processing on a predetermined region of an image captured by the imaging unit. The image processing unit determines the predetermined region based on a first angle which is a rotational angle of the imaging unit used to change the imaging direction and a second angle which is a rotational angle of the imaging unit used to correct the shake.

Further features of the present invention will become apparent from the following description of exemplary embodiments with reference to the attached drawings.

DESCRIPTION OF THE EMBODIMENTS

First Embodiment

A first embodiment will be described with reference to FIGS. 1 to 7.

Figure 1:
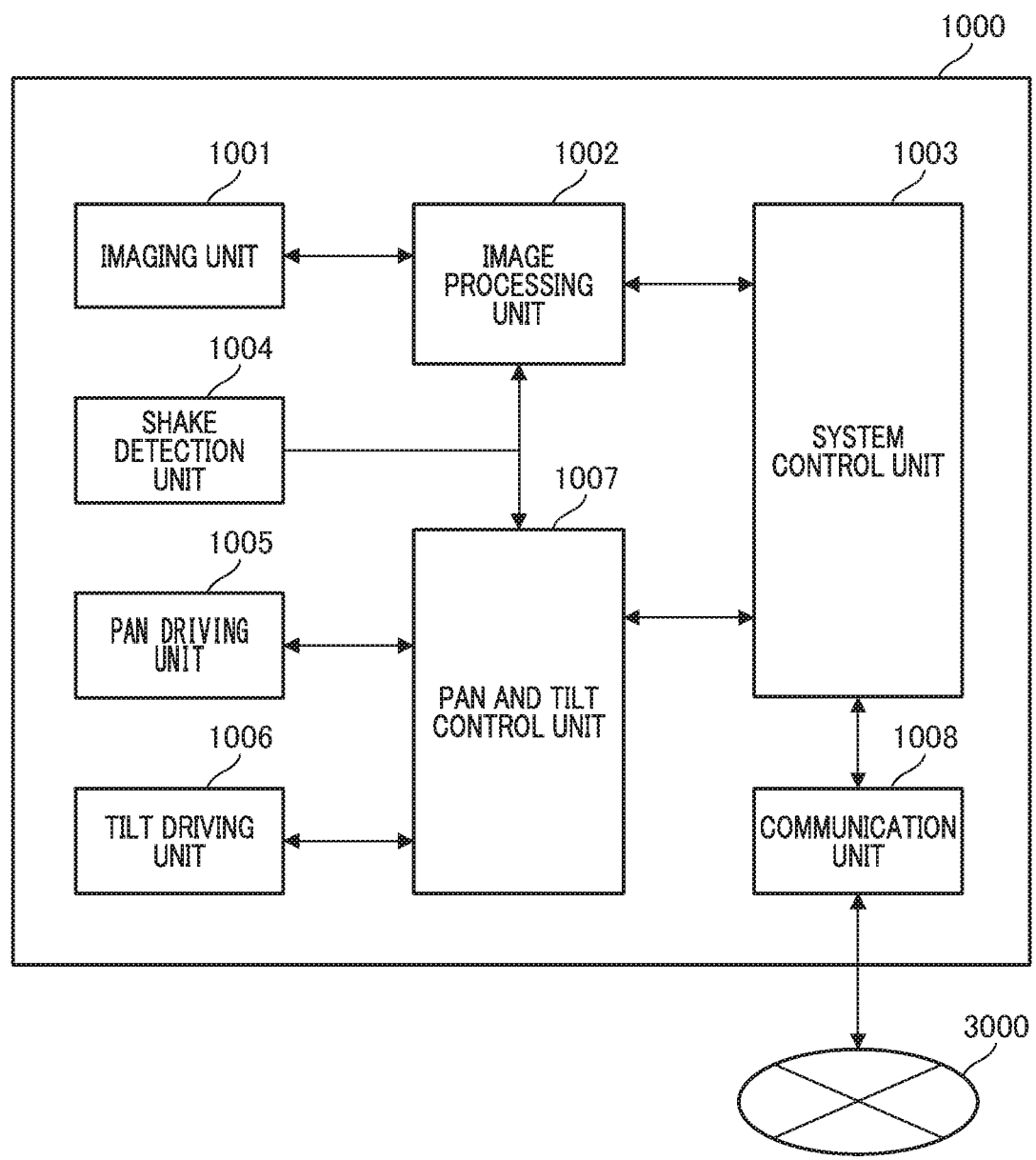
FIG. 1 is a diagram illustrating a configuration of an imaging device.

FIG. 1 is a diagram illustrating a configuration of an imaging device according to the embodiment. An imaging device 1000 is connected to a client device (an information processing device) (not illustrated) via a network 3000 such that the imaging device 1000 and the client device are able to communicate with one another. The imaging device 1000 includes an imaging unit 1001, an image processing unit 1002, a system control unit 1003, a shake detection unit 1004, a pan driving unit 1005, a tilt driving unit 1006, a pan and tilt control unit 1007, and a communication unit 1008. In the embodiment, the imaging device in which an imaging device body and a lens are integrated will be described, but may be of a lens-exchangeable type.

The imaging unit 1001 images a subject. The imaging unit 1001 includes a lens, an image sensor, and a control circuit, receives light from a subject formed as an image by an imaging optical system of the lens, and converts an optical image of the subject into an electrical signal through photoelectric conversion. The imaging unit 1001 may include a correction lens for moving a position of a subject formed as an image on the image sensor and may be able to perform optical image stabilization (optical image-shake correction) using the correction lens. The imaging unit 1001 may include an image sensor position movement unit that moves the image sensor in a yaw or pitch direction and may be able to perform optical image stabilization by moving the image sensor.

The image processing unit 1002 acquires the signal photoelectrically converted by the imaging unit 1001 and generates image data subjected to a development process, a compression and encoding process, and the like. The generated image data is delivered to the system control unit 1003. The image processing unit 1002 acquires pan and tilt angles or the like from the pan and tilt control unit 1007 and performs a drawing process for a privacy mask (hereinafter referred to as mask) to be described below.

The system control unit 1003 includes a central processing unit (CPU) and controls the entire imaging device 1000. The system control unit 1003 delivers the image data or the like to a client device via the communication unit 1008. The system control unit 1003 receives a camera control command transmitted from the client device via the communication unit 1008. The system control unit 1003 analyzes the acquired camera control command and performs a process in accordance with the command. The system control unit 1003 transmits a response to the camera control command to the client device. For example, the system control unit 1003 controls the image processing unit 1002 based on an instruction to adjust image quality or an instruction to set a privacy mask.

The shake detection unit 1004 outputs a detection result obtained by detecting vibration in each of a pan direction and a tilt direction of the imaging unit 1001 to the image processing unit 1002 and the system control unit 1003. The detection result is, for example, an angular velocity. The shake detection unit 1004 includes, for example, a gyro sensor or an acceleration sensor. The system control unit 1003 controls the pan driving unit 1005 and the tilt driving unit 1006 to control vibration applied to the imaging device 1000 based on the detection result acquired from the shake detection unit 1004.

The imaging device 1000 includes a plurality of driving units changing an imaging direction of the imaging unit 1001. In the embodiment, an example in which the imaging device 1000) includes the pan driving unit 1005 performing a panning (hereinafter abbreviated to pan) operation as a first driving unit and the tilt driving unit 1006 performing a tilting (hereinafter abbreviated to tilt) operation as a second driving unit will be described. The pan driving unit 1005 includes a mechanism unit performing a pan operation, an electric motor such as a stepping motor which is an actuator, and an encoder detecting a pan angle. The tilt driving unit 1006 includes a mechanism unit performing a tilt operation, an electric motor such as a stepping motor which is an actuator, and an encoder detecting a tilt angle. The pan and tilt control unit 1007 controls the pan driving unit 1005 and the tilt driving unit 1006 (hereinafter referred to as a pan and tilt driving unit) based on an instruction from the system control unit 1003.

Figure 2A:
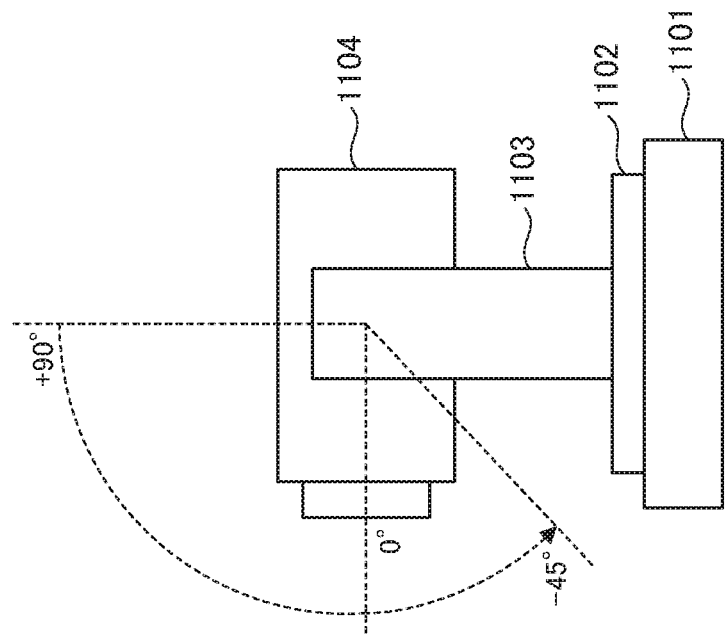
FIGS. 2A and 2B are diagrams illustrating pan and tilt driving.
Figure 2B:
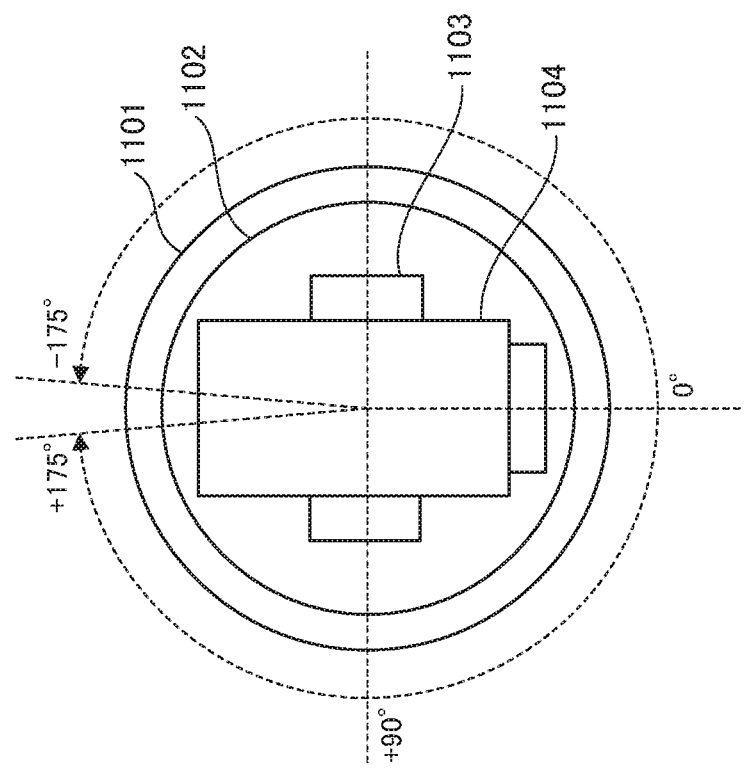

FIGS. 2A and 2B are diagrams illustrating pan and tilt driving. FIG. 2A is a diagram illustrating the imaging device 1000 when viewed from the upper surface and FIG. 2B is a diagram illustrating the imaging device 1000 when viewed from the lateral surface. The imaging device 1000 includes a bottom case 1101 which is a base (base stand), a turntable 1102, a camera head support 1103, and a camera head 1104.

A relation between the pan driving unit 1005 and the tilt driving unit 1006, and each unit illustrated in FIG. 1 will be described with reference to FIGS. 2A and 2B. The pan driving unit 1005 includes a bottom case 1101 and a turntable 1102. By rotating the turntable 1102 using a vertical axis as a central axis, driving in a panning direction is performed. The pan driving unit 1005 according to the embodiment can rotate in the panning direction from −175 degrees to +175 degrees.

The tilt driving unit 1006 includes the camera head support 1103 and the camera head 1104 above the turntable 1102. By rotating the camera head 1104 using an axis perpendicular to the vertical axis as a central axis, driving in a tilting direction is performed. The tilt driving unit 1006 according to the embodiment can rotate from −45 degrees in an obliquely downward direction to 90 degrees in an upright direction with the panning direction set to 0 degrees.

In this way, in the imaging device 1000 according to the embodiment, the pan and tilt control unit 1007 changes an imaging direction for imaging by rotating the camera head 1104 in the panning direction and the tilting direction. That is, the pan and tilt control unit 1007 functions as an imaging direction changing unit. By driving the camera head 1104 so that shake detected by the shake detection unit 1004 is cancelled out using the pan driving unit 1005 and the tilt driving unit 1006, it is possible to capture an image in which the shake is reduced. A driving range of the panning direction and the tilting direction according to the embodiment is exemplary, and the present invention is not limited thereto.

Figure 3A:
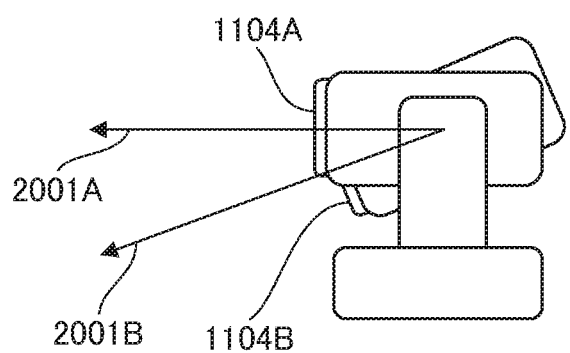
FIGS. 3A and 3B are diagrams illustrating a tilt angle change and a mask-drawn position.
Figure 3B:
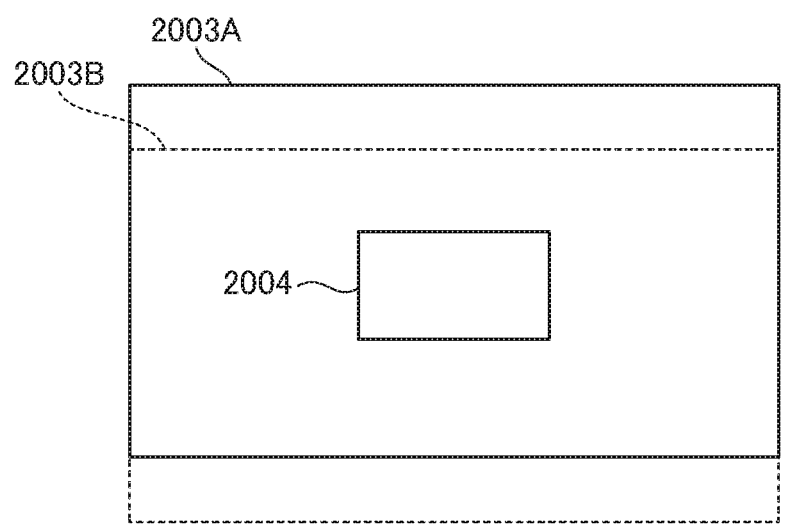

FIGS. 3A and 3B are diagrams illustrating a mask-drawn position when a tilt angle is changed. FIG. 3A is a diagram illustrating a tilt angle and an imaging direction and FIG. 3B is a diagram illustrating an imaging region and a mask-drawn position. A camera head 1104A indicates a state of the camera head 1104 when the tilt angle is 0 degrees. An imaging direction 2001A is an imaging direction of the camera head 1104A, that is, an imaging direction when the tilt angle is 0 degrees. The imaging direction 2001A is a horizontal direction. A camera head 1104B indicates a state of the camera head 1104 when the tilt angle is −10 degrees. An imaging direction 2001B is an imaging direction of the camera head 1104B, that is, an imaging direction when the tilt angle is −10 degrees.

An imaging region 2003A is an imaging region when the tilt angle is 0 degrees, that is, an imaging region of the camera head 1104A. An imaging region 2003B is an imaging region when the tilt angle is −10 degrees, that is, an imaging region of the camera head 1104B. A privacy mask region (hereinafter referred to as a mask region) 2004 is a region in which a privacy mask is drawn. The privacy mask region is a region in which imaging is desired to be avoided because of privacy protection or the like and is a region processed such that the region is not able to be seen by overlapping an image of a single color rectangle on the region. The privacy mask region may have a plurality of colors or a shape other than a rectangle.

The camera head 1104A of which a tilt angle is 0 degrees performs imaging in the horizontal direction indicated by the imaging direction 2001A. The camera head 1104B of which a tilt angle is −10 degrees images in a downward direction indicated by the imaging direction 2001B. When the tilt angle is moved to a position from 0 degrees to −10 degrees, the imaging region is moved in the downward direction and the position of a subject in the imaging region is moved in the upward direction. Therefore, when the tilt angle is moved to a position from 0 degrees to −10 degrees, it is necessary to move a mask region 2004 located at the center of the imaging region 2003A in the upward direction from the center of the imaging region 2003B. In the embodiment, the tilt direction will be described as an example. For the pan direction, a mask-drawn position in the horizontal direction is similarly moved with a pan angle. In this way, the imaging device 1000 causes the mask-drawn position in a captured image to be moved and tracked in accordance with pan and tilt angles so that a target region is masked even when the imaging direction is changed by PT.

Figure 4:
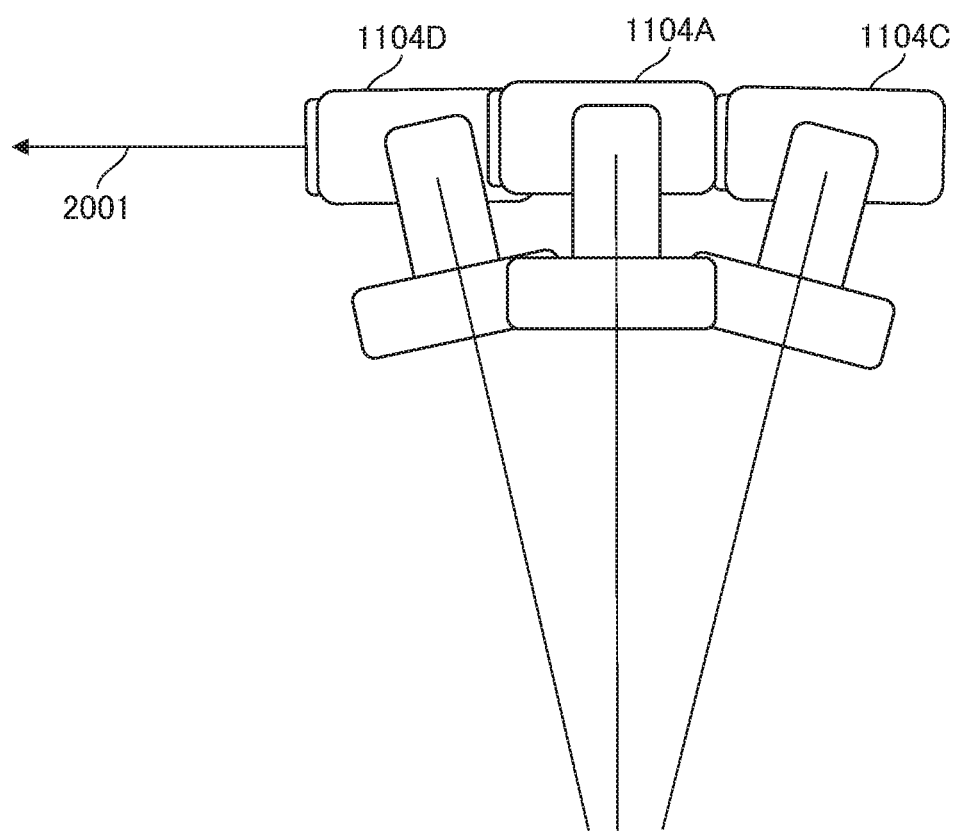
FIG. 4 is a diagram illustrating a motion of a camera head during image stabilization control.

FIG. 4 is a diagram illustrating a motion of a camera head during PT image stabilization control. The imaging direction 2001 is an imaging direction of the imaging device 1000. The camera head 1104A indicates a state of the camera head 1104 in a state in which there is no shake. A camera head 1104D indicates a state of the camera head 1104 for which tilt correction is performed when a ground plane is inclined forward due to shake. The camera head 1104C indicates a state of the camera head 1104 for which tilt correction is performed when the ground surface is inclined backward in accordance with shake.

In the state in which there is no shake, the camera head 1104A images in the imaging direction indicated by the imaging direction 2001 in the horizontal direction. When the imaging device 1000 is inclined backward due to shake of the ground surface, the imaging direction indicated by the imaging direction 2001 is maintained by controlling the tilt angle in the downward direction, as indicated by the camera head 1104C. When the imaging device 1000 is inclined forward due to shake of the ground surface, the imaging direction indicated by the imaging direction 2001 is maintained by controlling the tilt angle in the upward direction, as indicated by the camera head 1104D. In this way, in the PT image stabilization control, an inclination of the camera head 1104 due to the shake of the ground surface is detected by the shake detection unit 1004 and an image in which the shake is reduced is captured by controlling the pan driving unit 1005 and the tilt driving unit 1006 so that the imaging direction is maintained.

Figure 5:
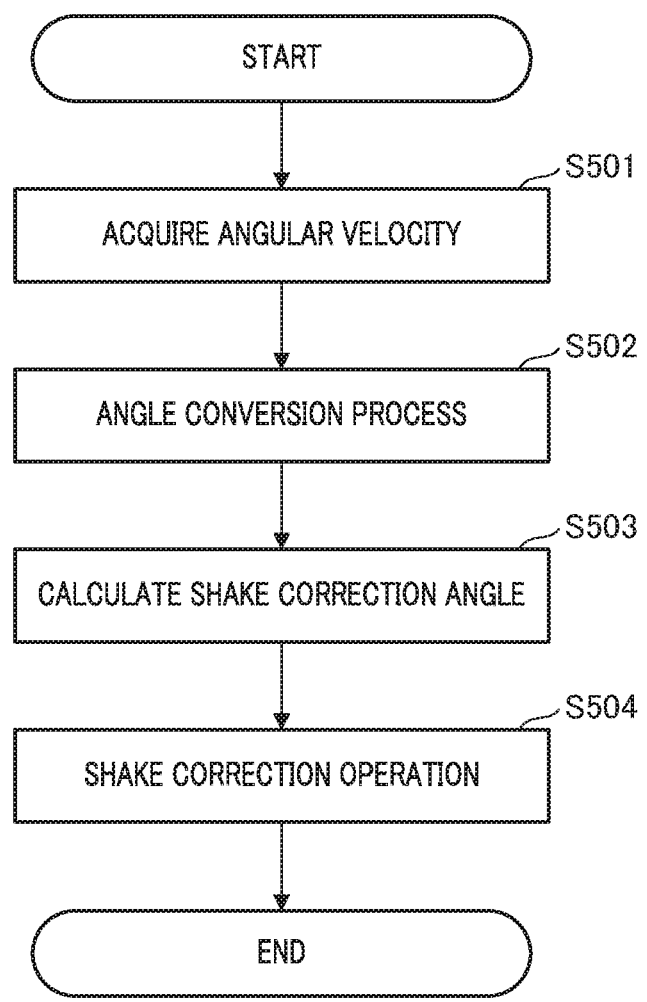
FIG. 5 is a flowchart illustrating an image stabilization control process.

FIG. 5 is a flowchart illustrating an image-shake correction process (a PT image stabilization process) by pan and tilt driving. The process starts simultaneously with starting of the imaging in the imaging device 1000.

In step S501, the pan and tilt control unit 1007 acquires an angular velocity in the pan direction and an angular velocity in the tilt direction detected by the shake detection unit 1004.

In step S502, the pan and tilt control unit 1007 performs an angle conversion process of converting the angular velocity acquired in step S501 into an angle value. The pan and tilt control unit 1007 calculates a pan angle value by integrating the acquired angular velocity in the pan direction with respect to time and calculates a tilt angle value by integrating the acquired angular velocity in the tilt direction with respect to time.

In step S503, the pan and tilt control unit 1007 performs a shake correction angle calculation process of calculating a shake correction angle from the angular value calculated in step S502. The pan and tilt control unit 1007 calculates a shake correction angle in the pan direction from the calculated pan angle value and calculates a shake correction angle in the tilt direction from the calculated tilt angle value. The shake correction angle is calculated so that an angle occurring due to the shake is cancelled out. For example, when the pan angle value is 0.1 degrees, the shake correction angle in the pan direction is assumed to be −0.1 degrees.

In step S504, the pan and tilt control unit 1007 instructs the pan driving unit 1005 and the tilt driving unit 1006 to perform driving in accordance with the correction angle in the pan direction and the tilt direction calculated in step S503. In this way, in the PT image stabilization control, the shake is corrected by controlling the pan and tilt driving unit so that the shake is cancelled out in accordance with the detected shake in each of the pan direction and the tilt direction.

During the PT image stabilization control, the pan and tilt angles are changed, of course, since the pan and tilt driving unit is controlled. When the mask-drawn position is tracked in accordance with the pan and tilt angles even during the PT image stabilization control, only a mask region is moved with respect to a captured image in which a constant imaging direction is maintained by image stabilization control and shake is reduced, and thus there is concern of a target region not being correctly masked. Accordingly, in the embodiment, trackability of the mask-drawn position during the PT image stabilization is improved.

Figure 6A:
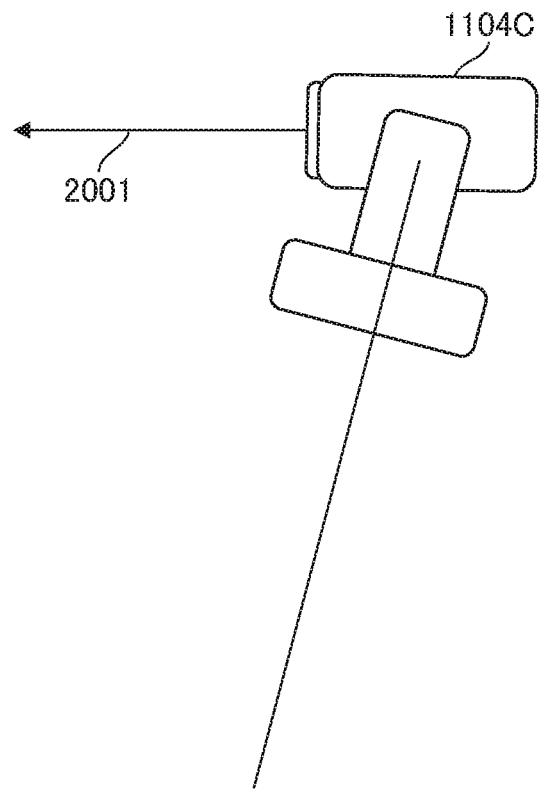
FIGS. 6A and 6B are diagrams illustrating a mask-drawn position during the image stabilization control.
Figure 6B:
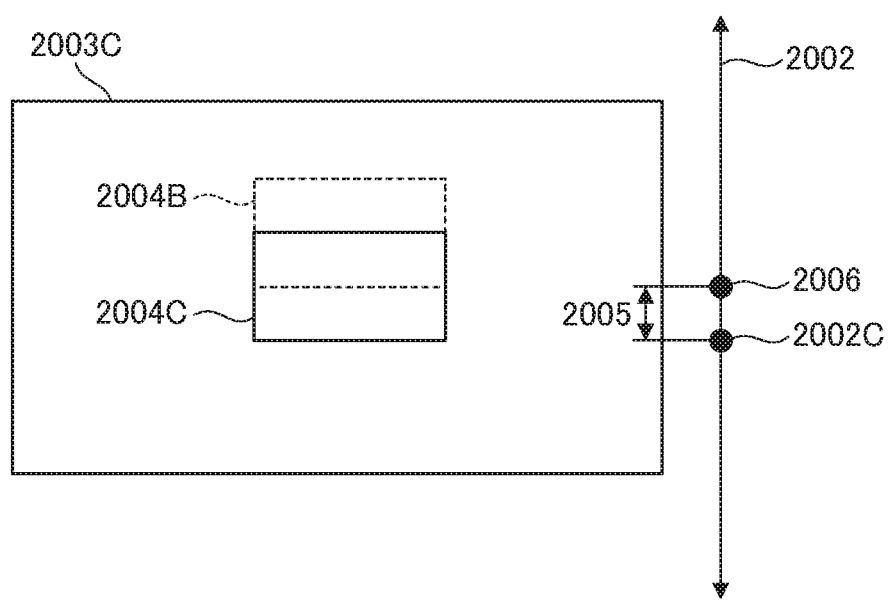

FIGS. 6A and 6B are diagrams illustrating a mask-drawn position during the PT image stabilization control. FIG. 6A illustrates the camera head during the image stabilization control and FIG. 6B illustrates an imaging region and a mask-drawn position. The imaging direction 2001 is an imaging direction and the camera head 1104C indicates a state of the camera head 1104 for which tilt correction is performed when the ground surface is inclined backward due to shake. Tilt coordinates 2002 are coordinates indicating a tilt angle, a tilt angle 2002C is a tilt angle during the PT image stabilization control, a correction angle 2005 is a correction angle by image stabilization, and an imaging angle 2006 is an imaging angle during the PT image stabilization control. An imaging region 2003C is an imaging region of the camera head 1104C during the PT image stabilization control. A mask region 2004B indicates a mask-drawn position calculated based on the tilt angle 2002C during the PT image stabilization control and a mask region 2004C indicates a mask-drawn position calculated based on the imaging angle 2006 during the PT image stabilization control.

When the imaging device 1000 is inclined backward due to shake of the ground surface, a tilt angle is controlled in the downward direction so that an imaging direction is maintained, as indicated in the camera head 1104C. When a region located at the center of the imaging region at the tilt angle of 0 degrees is set as a mask region and a mask-drawn position is calculated using the tilt angle, a tilt angle 2002C is downward. Therefore, the mask-drawn position is a position of the mask region 2004B moved in the upward direction from the center. However, the target region may not be correctly masked since only the mask image is moved with respect to the captured image in which the shake is reduced through the PT image stabilization control.

Accordingly, in the embodiment, an imaging angle 2006 during the PT image stabilization is obtained by reducing the correction angle 2005 in the tilt direction through the PT image stabilization from the tilt angle 2002C, and the mask region 2004C is calculated based on the imaging angle 2006. By reflecting the inclination of the camera head through the PT image stabilization in determination of a drawing position of the mask region, it is possible to improve trackability of the drawing position of the mask region in the captured image even during the PT image stabilization control.

Figure 7:
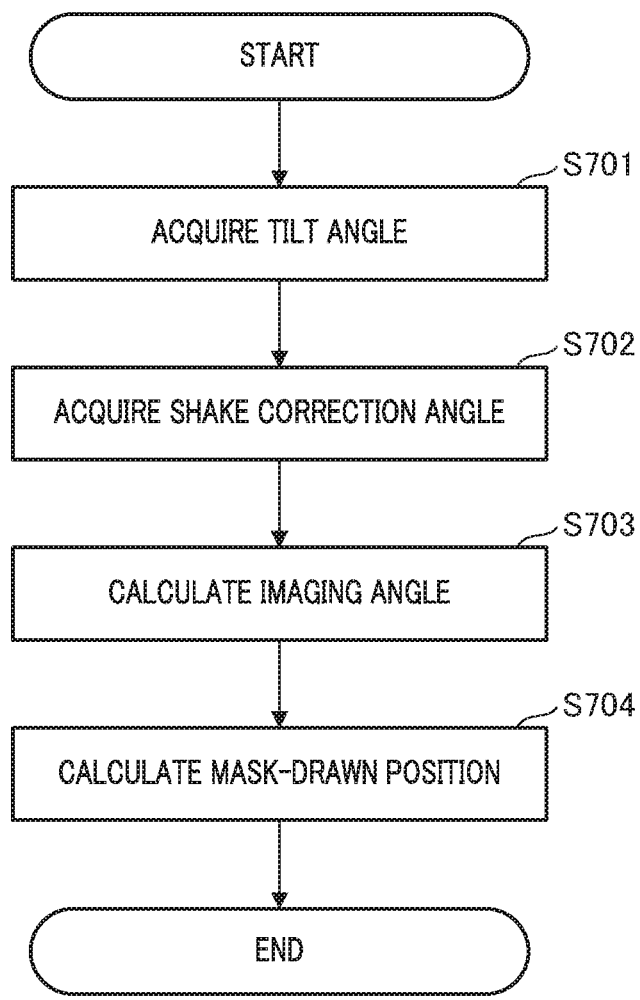
FIG. 7 is a flowchart illustrating a mask-drawn position calculation process during the image stabilization control.

FIG. 7 is a flowchart illustrating a drawing position calculation process for a mask region according to the embodiment. When the tilt driving unit 1006 starts driving, the pan and tilt control unit 1007 starts this process.

In step S701, the pan and tilt control unit 1007 acquires a tilt angle which is a rotational angle in the tilt direction from the tilt driving unit 1006. For example, the pan and tilt control unit 1007 acquires a tilt angle of the tilt driving unit 1006 from an angle detected by the encoder included in the tilt driving unit 1006.

In step S702, the pan and tilt control unit 1007 acquires a shake correction angle in the tilt direction. The shake correction angle is a value calculated in step S503 of the image stabilization control process.

In step S703, the pan and tilt control unit 1007 calculates an imaging angle in the vertical direction based on the tilt angle (a first angle) acquired in step S701 and the shake correction angle (a second angle) acquired in step S702. For example, when the tilt angle is −9.9 degrees and the correction angle is −10 degrees, the imaging angle is calculated by the following expression.

$$-9.9-(-10)=0.1°$$

Then, the pan and tilt control unit 1007 delivers the calculated imaging angle in the tilt direction to the image processing unit 1002.

In step S704, the image processing unit 1002 calculates a drawing position of the mask region in the vertical direction based on the imaging angle calculated in step S703 and performs a privacy mask drawing process. The image processing unit 1002 calculates, for example, a central position of the mask region as the drawing position of the mask region. For example, it is assumed that a vertical imaging field of view angle is 10 degrees, a vertical resolution is 1080 pixels, and a position in the vertical direction in an image is shown in a range of −540 to +540 in which its center is 0. It is assumed that the center of a mask region is set at the center of the image, that is, the position of 0, in a state in which there is no shake, that is, a tilt angle is 0 degrees. When the imaging angle calculated in step S703 is 0.1 degrees, a mask-drawn position is calculated by the following expression.

$$0+1080\times(-0.1/10)\approx-11$$

The vertical direction (tilt direction) has been described above. For the horizontal direction (the pan direction), the imaging angle in the horizontal direction is similarly calculated based on a current pan angle and a correction angle in the pan direction in the PT image stabilization control and a mask-drawn position in the horizontal direction is calculated based on the imaging angle. The image processing unit 1002 generates an image on which a mask overlaps in accordance with the calculated drawing position of the mask region in the horizontal direction and the vertical direction. In this way, by obtaining the imaging direction using the correction angle by the pan and tilt angles and the image stabilization control and calculating the privacy mask-drawn position based on the imaging direction, it is possible to improve trackability of the privacy mask-drawn position even during the PT image stabilization control.

In the embodiment, the method of tracking the drawing position of the privacy mask during the PT image stabilization control has been described, but the present invention is not limited thereto. The embodiment can be applied not only to the privacy mask function but also a function of performing imaging process on a predetermined region in a captured image and tracking the predetermined region subjected to the imaging process in the captured image in accordance with a change in an imaging direction by PT driving. For example, the embodiment can also be applied to an image compression process capable of reducing the size of entire image data by changing a compression ratio partially in a captured image, lowering the compression ratio of a specific region in which gazing is necessary and maintaining image quality, and raising the compression ratio in the other regions. According to the embodiment, it is possible to improve trackability of a predetermined region at a low compression ratio even during the PT image stabilization control. In a subject detection process of detecting a moving subject through image analysis, there is a function of setting a predetermined region in a captured image as a detection range and analyzing the region. According to the embodiment, it is possible to improve trackability of the detection range even during the PT image stabilization control. In this way, when it is necessary to track a predetermined region subjected to image processing in a captured image in accordance with a change in an imaging direction by PT, the embodiment can be applied.

In the embodiment, only the method of calculating a mask-drawn position during the PT image stabilization control has been described, but the present invention is not limited thereto. For example, a method of calculating a mask-drawn position may be switched between when normal PT driving, that is, PT driving for changing an imaging direction, is performed and when PT driving is performed through the PT image stabilization control. That is, when the normal PT driving is performed, a mask-drawn position may be calculated based on pan and tilt angles, and the mask-drawn position may be calculated based on the pan and tilt angles and a correction angle through the image stabilization control during the PT image stabilization control.

In the embodiment, the method of calculating and updating a mask-drawn position normally during pan and tilt driving has been described, but the present invention is not limited thereto. For example, since an image in which shake is reduced is captured during the PT image stabilization control, necessity for moving a mask-drawn position is insignificant. Therefore, the updating may be stopped without performing the process of calculating a mask-drawn position during the PT image stabilization control.

In the embodiment, the tilt angle which is a rotational angle in the tilt direction has been acquired from the encoder which is the tilt angle detection unit included in the tilt driving unit 1006, but the present invention is not limited thereto. For example, a driving instruction angle from the pan and tilt control unit 1007 to the pan and tilt driving unit, such as a step number of a stepping motor, may be acquired as the tilt angle. In the embodiment, the method of obtaining the positional relation between an imaging field of view angle and a captured image in the calculation of the mask-drawn position through linear approximation has been described, but the present invention is not limited thereto.

For example, a method of using a relational expression used to project an imaging field of view angle from an imaging spherical surface to an imaging plane for conversion may be used.

Second Embodiment

Next, a second embodiment in which a change in a camera position through image stabilization control is reflected will be described with reference to FIGS. 8A to 10. The previously used reference numerals are used for constituent elements similar to those of the first embodiment, and detailed description will be omitted.

Figure 8A:
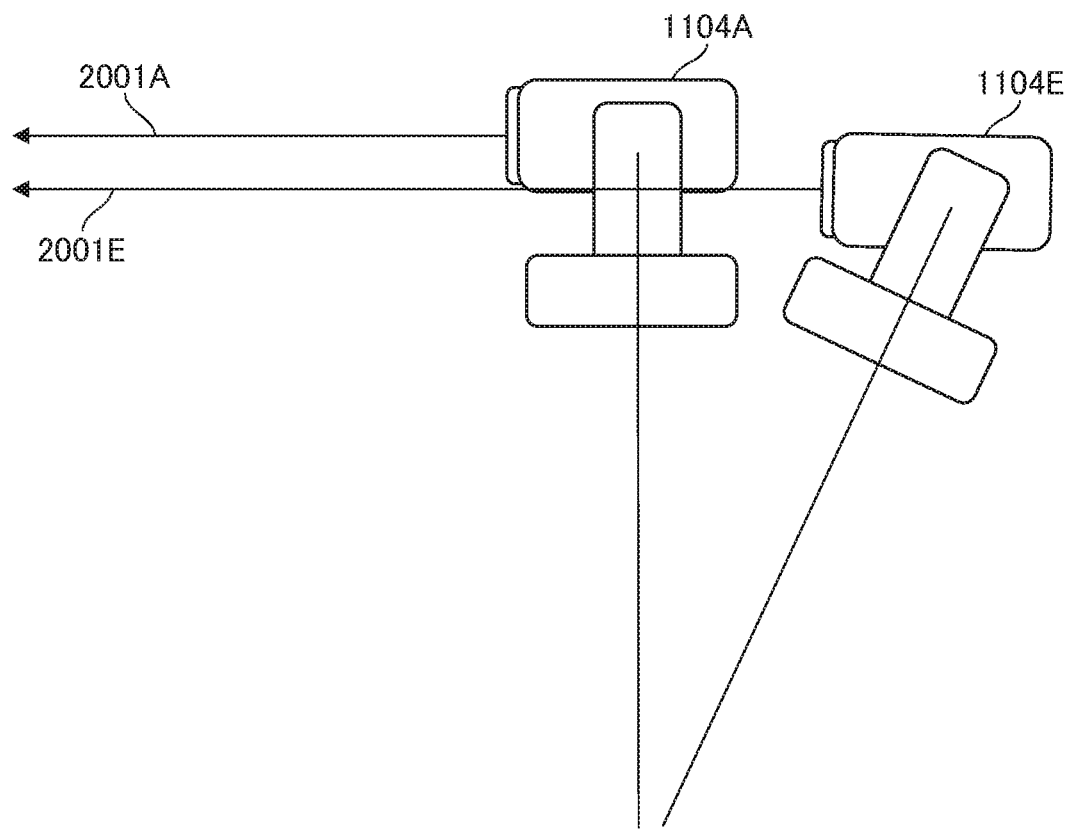
FIGS. 8A and 8B are diagrams illustrating a mask-drawn position when a camera position during the image stabilization control is changed.
Figure 8B:
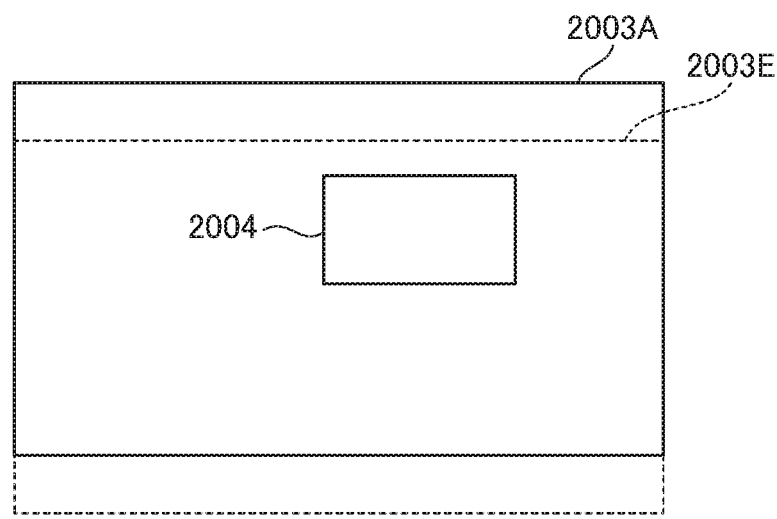

FIGS. 8A and 8B are diagrams illustrating a mask-drawn position when a camera position during the PT image stabilization control is changed. FIG. 8A illustrates a change in an imaging direction during PT image stabilization control and FIG. 8B illustrates an imaging region and a mask-drawn position. The camera head 1104A indicates a state of the camera head 1104 in a state in which there is no shake and a camera head 1104E indicates a state of the camera head 1104 when the ground surface is inclined backward due to shake. An imaging direction 2001A is an imaging direction in the camera head 1104A and an imaging direction 2001E is an imaging direction in the camera head 1104E. An imaging region 2003A is an imaging region in the camera head 1104A, an imaging region 2003E is an imaging region in the camera head 1104E, and a mask region 2004 is a privacy mask region.

For the camera head 1104E in a backward inclined state due to shake, an imaging direction is maintained through image stabilization control, but an imaging height is lower than the camera head 1104A depending on a shake state in some cases. The imaging region is also changed with a change in the imaging height due to the shake. With respect to the imaging region 2003A in the state in which there is no shake, the imaging region 2003E in the backward inclined state is a region shifted in the downward direction. At this time, the mask region 2004 in the imaging region 2003E is necessarily located in the upward direction from a position set in the imaging region 2003A as the imaging region is shifted in the downward direction.

Control is performed such that the imaging direction is maintained during the PT image stabilization control, but the imaging height is changed. Therefore, the position of a subject in the imaging region is changed. In the embodiment, by correcting the mask-drawn position in consideration of a change in the imaging height during the image stabilization control, it is possible to further improve trackability of a privacy mask-drawn position.

Figure 9:
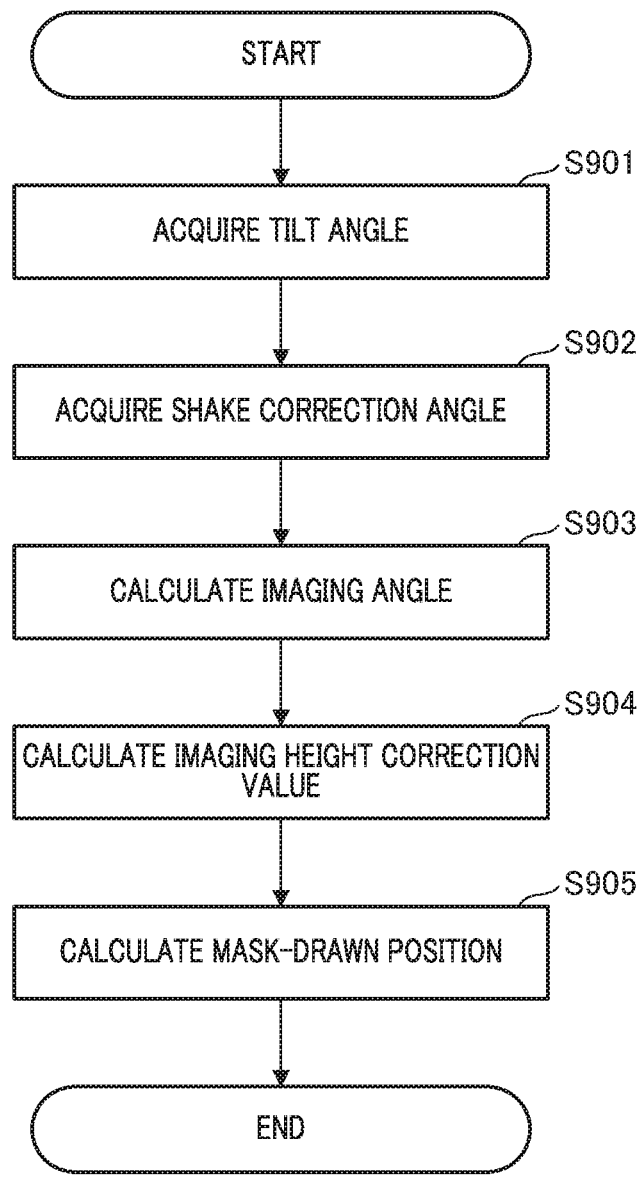
FIG. 9 is a flowchart illustrating the mask-drawn position calculation process during the image stabilization control.

FIG. 9 is a flowchart illustrating the mask-drawn position calculation process in the vertical direction according to the embodiment. When the tilt driving unit 1006 starts driving, the pan and tilt control unit 1007 starts this process.

In step S901, the pan and tilt control unit 1007 acquires a tilt angle which is a rotational angle in the tilt direction from the tilt driving unit 1006.

In step S902, the pan and tilt control unit 1007 acquires a correction angle in the tilt direction. The correction angle is a value calculated in step S503 of the image stabilization control process.

In step S903, the pan and tilt control unit 1007 calculates an imaging angle in the vertical direction based on the tilt angle acquired in step S901 and the correction angle acquired in step S902. For example, when the tilt angle is −9.9 degrees and the correction angle is −10 degrees, the imaging angle is calculated by the following expression.

−9.9−(−10)=0.1°

Then, the pan and tilt control unit 1007 delivers the calculated imaging angle in the tilt direction to the image processing unit 1002.

Figure 10:
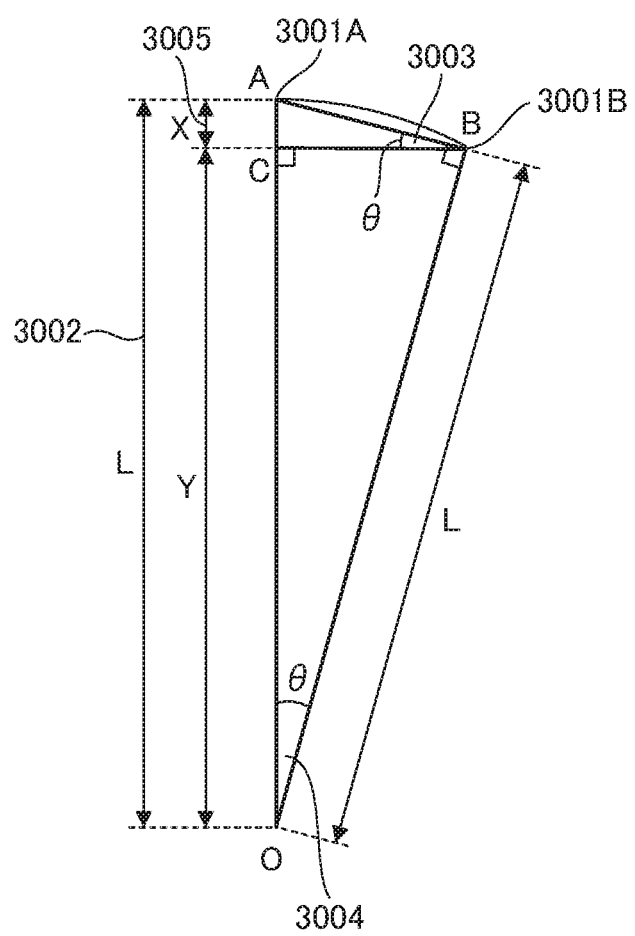
FIG. 10 is a diagram illustrating a change in an imaging height during the image stabilization control.

In step S904, the pan and tilt control unit 1007 calculates an imaging height correction value. Then, the pan and tilt control unit 1007 delivers the calculated imaging height correction value to the image processing unit 1002. Here, calculation of the imaging height correction value will be described with reference to FIG. 10. FIG. 10 is a diagram illustrating a change in an imaging height during the PT image stabilization control. A camera position 3001A is a position of the imaging device 1000 in a state in which there is no shake and a camera position 3001B is a position of the imaging device 1000 in a backward inclined state due to shake. An imaging height 3002 is an imaging height in the state in which there is no shake, a tilt angle 3003 is a tilt angle of the imaging device 1000, and a shake angle 3004 is a shake angle of the imaging device 1000.

It is assumed that the imaging device 1000 is inclined backward circularly due to shake and is moved from the camera position 3001A to the camera position 3001B. It is assumed that O is the center of the circle and L is a radius. The imaging height 3002 is a height from the center of the circle and a length of the imaging height 3002 is L. It is assumed that 0 is a tilt angle 3003 in a state in which an imaging direction of the imaging device 1000 is controlled in the horizontal direction through image stabilization control at the camera position 3001B.

It is assumed that A is the camera position 3001A, B is the camera position 3001B, and C is an intersection between B and a straight line AO when a perpendicular line is drawn from B to the straight line AO. At this time, since triangles ABO and ACB have a similarity relation and the tilt angle 3003 is the same as the shake angle 3004, the shake angle 3004 can be expressed as θ. Here, an imaging height Y at the camera position 3001B is expressed in Expression (1) below using the imaging height L at the camera position 3001A.

$$Y = L \cdot \cos \theta \quad (1)$$

An imaging height correction value X which is a difference between the imaging height L of the camera position 3001A and the imaging height Y of the camera position 3001B is expressed in Expression (2) below.

$$X = L - Y \quad (2)$$

Expression (3) is obtained from Expressions (1) and (2).

$$X = L - L \cdot \cos \theta = L(1 - \cos \theta) \quad (3)$$

For example, when the imaging height at the camera position 3001A is 10 m and the tilt angle is 10 degrees, the imaging height correction value X is obtained by the following expression.

$$X = 10 - (1 - \cos(10°)) \approx 0.15 \text{ m}$$

In step S905, the image processing unit 1002 calculates a mask-drawn position in the vertical direction. To calculate the mask-drawn position, the image processing unit 1002 first obtains a mask-drawn position correction value from the imaging height correction value calculated in step S904. For example, when a vertical resolution is 1080 pixels, an imaging region vertical direction is 20 m, and the imaging height correction value is 0.15 m from the previous calculation, a mask-drawn position correction value is calculated by the following expression.

1080×0.15/20≈8

Subsequently, the image processing unit 1002 calculates a mask-drawn position using the mask-drawn position correction value and performs a privacy mask drawing process. For example, it is assumed that a vertical imaging field of view angle is 10 degrees, a vertical resolution is 1080 pixels, and a position in the vertical direction in an image is shown in a range of −540 to +540 in which its center is 0. When the tilt angle is 0 degrees in the state in which there is no shake, a mask is set at the center of the image, that is, the position of 0. When the imaging angle is 0.1 degrees and the mask-drawn position correction value is 8 pixels in the previous calculation, the mask-drawn position is calculated by the following expression.

$$0+1080\times(-0.1/10)+8\approx 3$$

The vertical direction (tilt direction) has been described above. For the horizontal direction (the pan direction), the imaging angle in the horizontal direction is similarly calculated based on a current pan angle and a correction angle in the pan direction in the PT image stabilization control and an imaging height correction value in the horizontal direction is calculated based on the imaging angle. The image processing unit 1002 calculates a mask-drawn position in the horizontal direction based on the imaging angle in the horizontal direction and the imaging height correction value. Then, the image processing unit 1002 generates an image on which a mask overlaps in accordance with the calculated drawing position of the mask region in the horizontal direction and the vertical direction. In this way, by obtaining the correction value of the mask-drawn position in accordance with the change in the imaging height during the image stabilization control and calculating the corrected privacy mask-drawn position, it is possible to improve trackability of the privacy mask-drawn position even during the PT image stabilization control.

In the embodiment, the method of correcting the mask-drawn position in accordance with a change in the imaging height has been described, but the present invention is not limited thereto. For example, as illustrated in FIG. 8A, a distance from an imaged subject is more away in the camera head 1104E in the backward inclined state due to the shake than in the camera head 1104A in the state in which there is no shake. Conversely, in the state in which the camera head 1104 is inclined forward, a distance from a subject is closer than in the state in which there is no shake. The distance from the subject is changed in accordance with the shake and the size of the subject in the captured image is changed. The size of the mask may be corrected in accordance with the change in the size of the subject in the captured image with the change in the distance from the subject during the PT image stabilization control in addition to the correction of the mask-drawn position.

Third Embodiment

Next, a third embodiment in which occurrence of remaining shake (remaining correction) due to non-tracking of shake in image stabilization control is reflected will be described with reference to FIGS. 11A to 12. The previously used reference numerals are used for constituent elements similar to those of the first embodiment, and detailed description will be omitted.

In the PT image stabilization control, with regard to shake of a frequency exceeding responsiveness of a PT driving unit or a large amplitude, the shake is no tracked and remaining shake occurs. FIGS. 11A and 11B are diagrams illustrating a position of the camera head and a mask-drawn position when remaining shake occurs in the image stabilization operation. FIG. 11A illustrates an imaging direction and FIG. 11B illustrates an imaging region and a mask-drawn position.

Figure 11A:
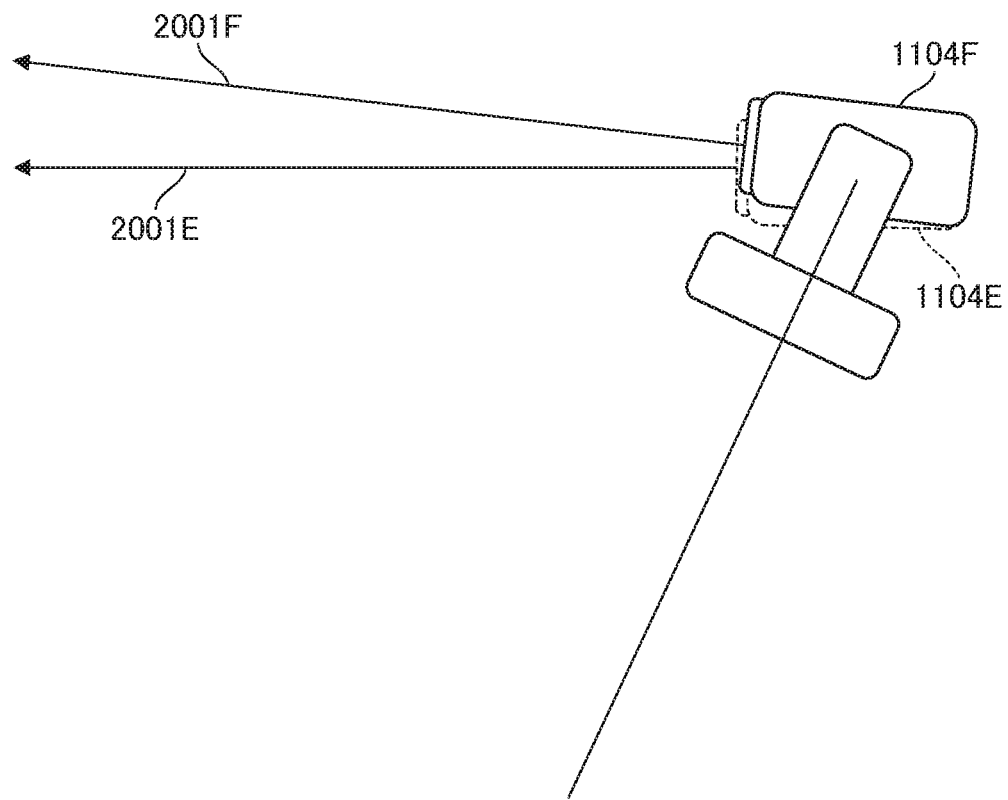
FIGS. 11A and 11B are diagrams illustrating a change in the camera head and a mask-drawn position during the image stabilization control.
Figure 11B:
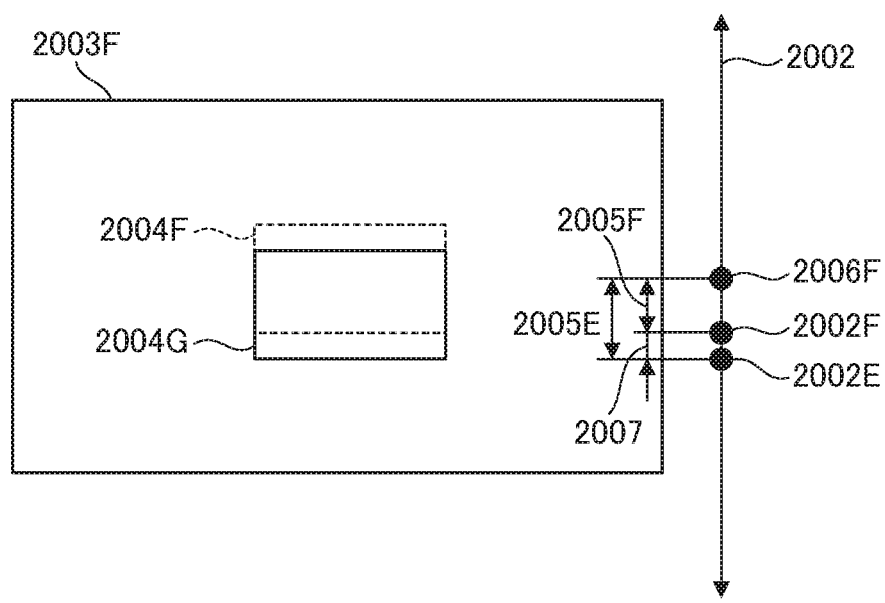

In FIG. 11A, a camera head 1104E indicated by a dotted line is the camera head 1104 in a state in which shake correction can be sufficiently performed by image stabilization control, that is, a state in which there is no remaining shake. A camera head 1104F indicated by a solid line is the camera head 1104 in a state in which there is remaining shake. The imaging direction 2001E is an imaging direction in the state of the camera head 1104E and an imaging direction 2001F is an imaging direction in the state of the camera head 1104F.

In FIG. 11B, an imaging region 2003F is an imaging region in the state of the camera head 1104F, a mask region 2004F is a privacy mask region before correction of the remaining shake, and a mask region 2004G is a privacy mask region after the correction of the remaining shake. The tilt coordinates 2002 are coordinates indicating a tilt angle, a tilt angle 2002E is a tilt angle in a state in which the shake correction can be sufficiently performed, a tilt angle 2002F is a tilt angle in a state in which there is the remaining shake, and an imaging angle 2006F is an imaging angle during the PT image stabilization control. An ideal correction angle 2005E is an ideal correction angle when there is no remaining shake, an actual correction angle 2005F is a correction angle when there is remaining shake, and an angle 2007 is remaining shake angle.

An ideal correction angle necessary to sufficiently correct shake exceeding responsiveness of the PT driving unit is the ideal correction angle 2005E, but a correction angle by which correction can be actually performed by driving the PT driving unit is the actual correction angle 2005F when responsiveness of the PT driving unit is considered. A difference between the ideal correction angle 2005E and the actual correction angle 2005F is an angle 2007 of the remaining shake. For example, in FIG. 11A, a more upper direction is imaged for the imaging direction 2001F in the state in which there is the remaining shake than the imaging direction 2001E in the state in which the shake correction can be sufficiently performed. When the imaging angle 2006F is obtained from the actual correction angle 2005F in the state in which there is the remaining shake and the mask-drawn position is calculated based on the imaging angle 2006F, the position of the mask region 2004F is obtained. However, the imaging direction in the state in which there is the remaining shake is oriented more in the upward direction than in the state in which the correction is sufficient. Therefore, the privacy mask region is necessarily located in a lower direction than the mask region 2004F by the angle 2007 of the remaining shake, as indicated in the mask region 2004G.

In the embodiment, even when the remaining shake occurs with regard to the shake which may not be tracked by the PT image stabilization control, it is possible to further improve trackability of the privacy mask-drawn position by correcting the mask-drawn position in consideration of the remaining shake.

Figure 12:
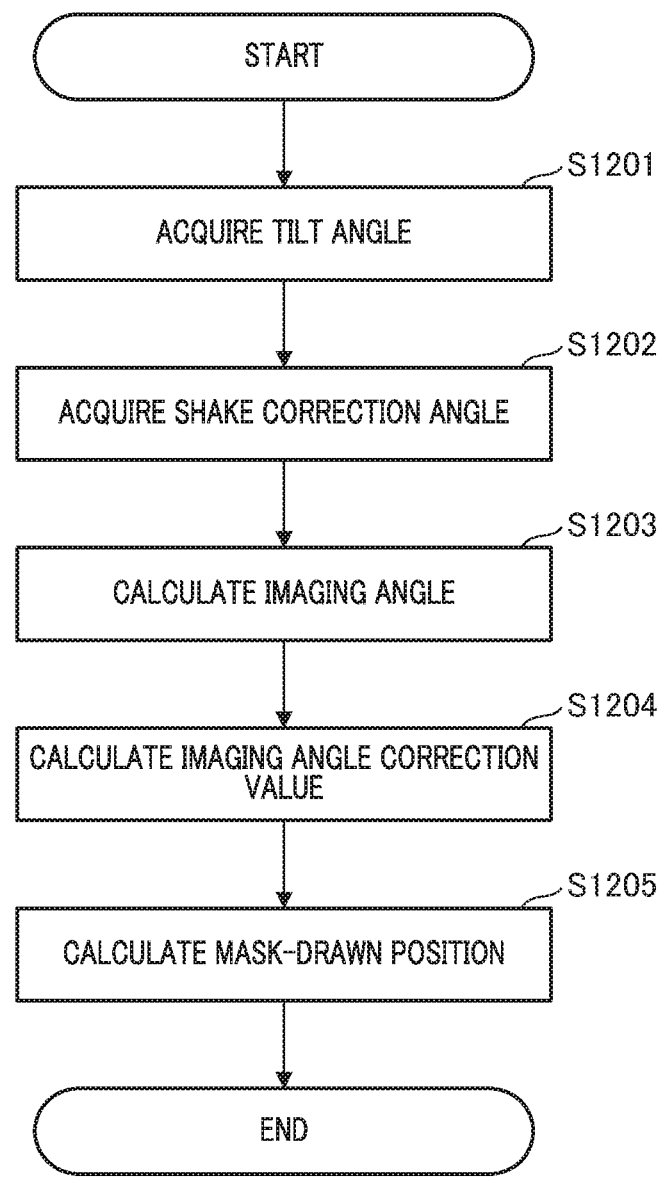
FIG. 12 is a flowchart illustrating a mask-drawn position calculation process during the image stabilization control.

FIG. 12 is a flowchart illustrating a mask-drawn position calculation process in the vertical direction according to the embodiment. When the tilt driving unit 1006 starts driving, the pan and tilt control unit 1007 starts this process.

In step S1201, the pan and tilt control unit 1007 acquires a tilt angle which is a rotational angle in the tilt direction from the tilt driving unit 1006.

In step S1202, the pan and tilt control unit 1007 acquires a correction angle in the tilt direction. The correction angle is an actual correction angle calculated based on the ideal correction angle calculated in step S503 of the image stabilization control process and the responsiveness of the PT driving unit. For example, when a range in which the PT driving unit can perform correction is set from −10 degrees to +10 degrees and the ideal correction angle is set to −11 degrees, the actual correction angle at which the responsiveness of the PT driving unit is considered is −10 degrees.

In step S1203, the pan and tilt control unit 1007 calculates an imaging angle in the vertical direction. For example, when the tilt angle acquired from the tilt driving unit 1006 is −9.9 degrees and the correction angle is −10 degrees, the imaging angle is calculated by the following expression. When there is a difference between the ideal correction angle and the actual correction angle, the imaging angle calculated in step S1203 is an imaging angle at which there is the remaining shake.

$$-9.9-(-10)=0.1°$$

In step S1204, the pan and tilt control unit 1007 calculates an imaging angle correction value based on the ideal correction angle and the actual correction angle. When a mask region is determined based on the imaging angle calculated in step S1203, a desired region may not be masked due to an influence of the remaining shake. Therefore, in the embodiment, the imaging angle correction value obtained by correcting the remaining shake angle is calculated and a drawing position of the mask region is determined based on the imaging angle correction value. The remaining shake angle is a difference between the actual correction angle calculated in step S1202 and the ideal correction angle. For example, when the ideal correction angle in the tilt direction is −11 degrees and the actual correction angle is −10 degrees, the remaining shake angle is calculated by the following expression.

$$-10-(-11)=1°$$

The imaging angle correction value can be obtained by adding the calculated remaining shake angle and the imaging angle calculated in step S1203. When the remaining shake angle is 1 degree and the imaging angle is 0.1 degrees, the imaging angle correction value is calculated by the following expression.

$$0.1+1=1.1°$$

Then, the pan and tilt control unit 1007 delivers the calculated imaging angle correction value to the image processing unit 1002.

In step S1205, the image processing unit 1002 calculates a mask-drawn position in the vertical direction and performs a privacy mask drawing process. For example, it is assumed that a vertical imaging field of view angle is 10 degrees, a vertical resolution is 1080 pixels, and a position in the vertical direction in an image is shown in a range of −540 to +540 in which its center is 0. In the state in which there is no shake, when the tilt angle is 0 degrees, the mask is set at the center of the image, that is, the position of 0. When the imaging angle correction value is 1.1 degrees by the previous calculation, a mask-drawn position is calculated by the following expression.

$$0+1080\times(-1.1/10)≈-119$$

The vertical direction (tilt direction) has been described above. For the horizontal direction (the pan direction), the mask region in which the remaining shake is considered can be similarly calculated. An imaging angle correction value is calculated by correcting the imaging angle calculated from the current pan angle and the actual correction angle in the pan direction in the PT image stabilization control using the remaining shake angle calculated from the actual correction angle in the pan direction in the PT image stabilization control and the ideal correction angle. Then, the image processing unit 1002 determines the drawing position of the mask region based on the imaging angle correction value and generates an image on which the mask overlaps in accordance with the calculated drawing position of the mask region in the horizontal direction and the vertical direction. In this way, even when the remaining shake occurs in the embodiment, it is possible to improve trackability of the privacy mask-drawn position during the PT image stabilization control by correcting the mask-drawn position in consideration of the remaining shake.

In the embodiment, the method of correcting the mask-drawn position when there is the remaining shake has been described, but the present invention is not limited thereto. For example, the size of the mask region may be corrected in accordance with the remaining shake and the size of the mask may be set to be larger by the remaining shake so that the mask target region is masked.

Other Embodiments

In the foregoing embodiments, the examples of the imaging devices connected to a client device (information processing device) via a network have been described, but the embodiments can also be realized in an imaging device not connected to a client device via a network. An imaging device which can be carried by a user may be used without being limited to an imaging device used for a surveillance system.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-016155, filed Jan. 31, 2019, which is hereby incorporated by reference wherein in its entirety.

What is claimed is:

1. An imaging device comprising:
   at least one processor and a memory holding a program which makes the processor function as:
   an imaging unit that images a subject;
   a detection unit that detects shake of the imaging unit;
   a pan and tilt driving unit that rotates the imaging unit in a panning direction and a tilting direction;
   an imaging direction changing unit configured to control the pan and tilt driving unit such that an imaging direction of the imaging unit is changed;
   a correction unit configured to control the pan and tilt driving unit in accordance with a detection result of the detection unit such that shake is corrected; and
   an image processing unit configured to perform image processing on a predetermined region of an image captured by the imaging unit,
   wherein the image processing unit determines the predetermined region based on a difference between a first angle which is a tilt angle of the imaging unit used to change the imaging direction and a second angle which is a shake correction angle of the imaging unit used to correct the shake.

2. The imaging device according to claim 1:
   wherein the image processing unit determines the predetermined region based on the first angle, the second angle, and a height of the imaging unit.

3. An imaging device comprising:
   at least one processor and a memory holding a program which makes the processor function as:
   an imaging unit that images a subject;
   a detection unit that detects shake of the imaging unit;
   a pan and tilt driving unit that rotates the imaging unit in a panning direction and a tilting direction;
   an imaging direction changing unit configured to control the pan and tilt driving unit such that an imaging direction of the imaging unit is changed;
   a correction unit configured to control the pan and tilt driving unit in accordance with a detection result of the detection unit such that shake is corrected; and
   an image processing unit configured to perform image processing on a predetermined region of an image captured by the imaging unit,
   wherein, when there is remaining shake which is not correctable through the correction of the shake by the correction unit, the image processing unit determines the predetermined region based on a first angle which is a tilt angle of the imaging unit used to change the imaging direction, a second angle which is a shake correction angle of the imaging unit used to correct the shake, and an angle of the remaining shake.

4. The imaging device according to claim 3, wherein the angle of the remaining shake is a difference between a first correction angle calculated by the correction unit based on a detection result of the detection unit and a second correction angle corrected by the correction unit by controlling the pan and tilt driving unit.

5. The imaging device according to claim 1, wherein the image processing is a privacy mask drawing process of masking the predetermined region.

6. The imaging device according to claim 1, wherein the image processing is an image compression process of changing a compression ratio and compressing an image in the predetermined region and another region.

7. The imaging device according to claim 1, wherein the image processing is a process of detecting a subject in the predetermined region.

8. A control method for an imaging device including at least one processor and a memory holding a program which makes the processor function as: an imaging unit that images a subject, a detection unit that detects shake of the imaging unit, and a pan and tilt driving unit that rotates the imaging unit in a panning direction and a tilting direction, the method comprising:
   controlling the pan and tilt driving unit such that an imaging direction of the imaging unit is changed;
   controlling the pan and tilt driving unit in accordance with a detection result of the detection unit such that shake is corrected; and
   performing image processing on a predetermined region of an image captured by the imaging unit,
   wherein, in the image processing, the predetermined region is determined based on a difference between a first angle which is a tilt angle of the imaging unit used to change the imaging direction and a second angle which is a shake correction angle of the imaging unit used to correct the shake.

9. A non-transitory recording medium storing a control program causing a computer to perform each step of a control method for an imaging device including at least one processor functioning as: an imaging unit that images a subject, a detection unit that detects shake of the imaging unit, and a pan and tilt driving unit that rotates the imaging unit in a panning direction and a tilting direction, the method comprising:
   controlling the pan and tilt driving unit such that an imaging direction of the imaging unit is changed;
   controlling the pan and tilt driving unit in accordance with a detection result of the detection unit such that shake is corrected; and
   performing image processing on a predetermined region of an image captured by the imaging unit,
   wherein, in the image processing, the predetermined region is determined based on a difference between a first angle which is a tilt angle of the imaging unit used to change the imaging direction and a second angle which is a shake correction angle of the imaging unit used to correct the shake.

* * * * *